US011473989B2

(12) United States Patent
Sukalski

(10) Patent No.: US 11,473,989 B2
(45) Date of Patent: Oct. 18, 2022

(54) MULTI-DIMENSIONAL SHEAVE FOR USE IN TENSION MEASUREMENT SYSTEMS

(71) Applicant: Illinois Tool Works Inc., Glenview, IL (US)

(72) Inventor: Andrew James Sukalski, Fairmont, MN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 16/526,549

(22) Filed: Jul. 30, 2019

(65) Prior Publication Data
US 2020/0041368 A1 Feb. 6, 2020

Related U.S. Application Data

(60) Provisional application No. 62/712,613, filed on Jul. 31, 2018.

(51) Int. Cl.
*G01L 5/06* (2006.01)
(52) U.S. Cl.
CPC ...................... *G01L 5/06* (2013.01)
(58) Field of Classification Search
CPC . G01L 5/06; G01L 5/107; G01L 5/108; F16H 55/50
See application file for complete search history.

(56) References Cited

U.S. PATENT DOCUMENTS

| 2,444,245 | A | * | 6/1948 | Campbell | ................. | G01L 5/10 73/862.454 |
| 3,310,981 | A | * | 3/1967 | Nixon | ....................... | G01L 5/08 73/862.454 |
| 3,397,721 | A | * | 8/1968 | Lovelett | .................... | B21F 9/00 140/147 |
| 3,494,183 | A | * | 2/1970 | Sokolosky | ................ | G01L 5/04 73/862.451 |
| 3,611,821 | A | * | 10/1971 | Legler | .................. | F16H 55/566 474/45 |

(Continued)

FOREIGN PATENT DOCUMENTS

| CN | 101330199 | 12/2008 |
| CN | 105683084 | 6/2016 |

(Continued)

OTHER PUBLICATIONS

PCT, Notification of Transmittal of the International Search Report and the Written Opinion of the International Searching Authority, or the Declaration, Application No. PCT/US2019/044291, 18 pages.

(Continued)

*Primary Examiner* — Tran M. Tran
(74) *Attorney, Agent, or Firm* — McAndrews, Held & Malloy, Ltd.

(57) ABSTRACT

Disclosed is a sheave for use in a tension measurement system to measure a tension force in a cable. The sheave includes a first diameter and a second diameter. The sheave is configured to rotate about an axis to orient the first diameter or the second diameter toward the cable, such that a contact force between the sheave and the cable is measured by a tension sensor to determine the tension force in the cable.

20 Claims, 4 Drawing Sheets

(56) References Cited

U.S. PATENT DOCUMENTS

| | | | | |
|---|---|---|---|---|
| 3,720,100 A | * | 3/1973 | Grunbaum | G01L 5/04 |
| | | | | 73/862.451 |
| 3,832,899 A | * | 9/1974 | Nicolau | G01L 5/08 |
| | | | | 73/862.194 |
| 3,979,963 A | * | 9/1976 | Goettl | F16H 55/566 |
| | | | | 474/902 |
| 4,033,492 A | * | 7/1977 | Imai | B21B 37/50 |
| | | | | 226/25 |
| 4,171,640 A | * | 10/1979 | van Mastrigt | G01L 5/107 |
| | | | | 73/862.451 |
| 4,226,133 A | * | 10/1980 | Hanke | F16H 55/566 |
| | | | | 474/42 |
| 4,241,616 A | * | 12/1980 | Mastrigt | G01L 5/04 |
| | | | | 73/862.451 |
| 4,287,759 A | * | 9/1981 | Cooper | G01L 5/107 |
| | | | | 254/273 |
| 4,417,718 A | * | 11/1983 | Niskin | B66D 3/06 |
| | | | | 254/394 |
| 4,459,754 A | * | 7/1984 | Yasuda | G01B 5/025 |
| | | | | 33/555.4 |
| 4,487,068 A | * | 12/1984 | Hawkins | G01N 29/14 |
| | | | | 73/159 |
| 4,492,363 A | * | 1/1985 | Niskin | B66D 3/06 |
| | | | | 254/275 |
| 4,503,921 A | * | 3/1985 | Polen | G01G 19/027 |
| | | | | 73/862.56 |
| 4,534,228 A | * | 8/1985 | Burbank, Jr. | G01L 5/08 |
| | | | | 73/862.454 |
| 4,708,321 A | * | 11/1987 | Niskin | B63B 21/04 |
| | | | | 254/397 |
| 4,725,258 A | * | 2/1988 | Joanis, Jr. | F16H 55/566 |
| | | | | 474/33 |
| 4,759,226 A | * | 7/1988 | Leurer | B65H 59/40 |
| | | | | 73/862.473 |
| 4,960,266 A | * | 10/1990 | McDowell | B65H 57/14 |
| | | | | 254/134.3 PA |
| 4,989,450 A | | 2/1991 | Shoberg | |
| 5,029,469 A | * | 7/1991 | Chase | G01L 5/04 |
| | | | | 73/159 |
| 5,138,878 A | * | 8/1992 | Cresson | G01L 5/045 |
| | | | | 73/159 |
| 5,365,797 A | * | 11/1994 | McCrory, III | G01L 5/10 |
| | | | | 73/862.391 |
| 5,559,294 A | * | 9/1996 | Hoium | G01L 3/1478 |
| | | | | 73/862.44 |
| 5,892,157 A | * | 4/1999 | Syre | G01L 5/10 |
| | | | | 73/812 |
| 5,905,211 A | * | 5/1999 | Wiedenheft, III | G01L 5/106 |
| | | | | 73/862.391 |
| 6,134,974 A | * | 10/2000 | Grover | G01L 5/10 |
| | | | | 73/862.451 |
| 6,250,168 B1 | * | 6/2001 | D'Aguanno | A63B 60/42 |
| | | | | 73/865.3 |
| 6,435,725 B1 | * | 8/2002 | Smith | B63H 9/10 |
| | | | | 384/492 |
| 6,635,000 B2 | * | 10/2003 | Meindl | B61B 12/02 |
| | | | | 492/39 |
| 6,656,068 B2 | * | 12/2003 | Aitcin | F16H 9/125 |
| | | | | 474/12 |
| 6,901,818 B1 | * | 6/2005 | Cheung | G01L 5/10 |
| | | | | 114/230.1 |
| 7,032,320 B2 | * | 4/2006 | Ischdonat | G01L 5/102 |
| | | | | 33/501.02 |
| 8,069,737 B2 | * | 12/2011 | Hanoun | G01L 5/106 |
| | | | | 73/862.474 |
| 8,156,802 B2 | * | 4/2012 | Werber | G01L 5/102 |
| | | | | 73/159 |
| 9,221,651 B2 | * | 12/2015 | Thomas | E21F 13/025 |
| 9,290,909 B2 | * | 3/2016 | Brenny | E02F 3/36 |
| 9,366,589 B2 | * | 6/2016 | Gonzalez Gallegos | |
| | | | | G01L 5/107 |
| 9,394,033 B2 | * | 7/2016 | Firing | B63B 21/04 |
| 9,576,475 B2 | * | 2/2017 | Bardin | H04W 4/80 |
| 9,927,017 B2 | * | 3/2018 | van den Heuvel | F16H 55/50 |
| 10,107,699 B2 | * | 10/2018 | Bardin | G08C 17/02 |
| 10,309,443 B1 | * | 6/2019 | Driver | F16G 11/04 |
| 10,329,116 B2 | * | 6/2019 | Feng | B65H 59/40 |
| 10,345,170 B2 | * | 7/2019 | Jubeck | H02G 1/08 |
| 10,359,347 B2 | * | 7/2019 | Mupende | G01N 3/08 |
| 10,557,540 B2 | * | 2/2020 | Ervin | B66D 1/36 |
| 10,605,693 B2 | * | 3/2020 | Suzuki | G01L 5/0028 |
| 10,724,911 B1 | * | 7/2020 | Lawson | G01L 5/107 |
| 10,782,198 B2 | * | 9/2020 | Jubeck | G01L 5/108 |
| 2002/0042313 A1 | | 4/2002 | Aitcin | |
| 2008/0265932 A1 | * | 10/2008 | Shibata | G01R 31/2893 |
| | | | | 324/756.05 |
| 2010/0016109 A1 | * | 1/2010 | Walton | F16H 55/50 |
| | | | | 474/199 |
| 2011/0089284 A1 | * | 4/2011 | Bartolone | B65H 59/32 |
| | | | | 242/417.3 |
| 2011/0251803 A1 | | 10/2011 | Teurlay | |
| 2013/0082223 A1 | * | 4/2013 | Kippernes | B66D 1/50 |
| | | | | 254/277 |
| 2017/0133580 A1 | * | 5/2017 | Hansson | D05B 47/06 |

FOREIGN PATENT DOCUMENTS

| | | |
|---|---|---|
| EP | 0802404 | 10/1997 |
| GB | 1122100 | 7/1968 |

OTHER PUBLICATIONS

Canadian Office Action Appln No. 3,107,121 dated Jan. 11, 2022.

* cited by examiner

MULTI-DIMENSIONAL SHEAVE FOR USE IN TENSION MEASUREMENT SYSTEMS

CROSS-REFERENCE TO RELATED APPLICATIONS

This application claims the benefit of U.S. Provisional Application No. 62/712,613, filed Jul. 31, 2018, entitled "Multi-Dimensional Sheave for Use in Tension Measurement Systems." The entire content of the above-referenced application is incorporated herein by reference.

BACKGROUND

Tension measurement systems are employed to measure the tension force in a cable. Conventional systems are equipped with multiple sheaves of varying sizes that must be changed to measure the tension force in cables of different sizes.

For example, when converting the measurement system from a smaller diameter cable to larger diameter cable (or vice-versa), three of the larger sheaves must be removed and replaced with three smaller sheaves. Such a process is time-consuming, and handling multiple sheaves makes them prone to misplacement, which may lead an operator to use a sheave that is not sized for the selected cable. The result can be incorrect or inaccurate readings, or damage to the measuring system and/or the cable.

Thus, a tension measurement system that avoids the need for multiple sheaves while proving the flexibility of accurately measuring multiple cables of varying diameters is desirable.

SUMMARY

The present disclosure relates generally to a sheave having multiple diameters. In particular, the sheave is configured for use in a tension measurement system to measure a tension force in cables of different diameters.

More particularly, the presently disclosed sheave can eliminate the need to replace sheaves during a measuring operation for multiple cables. Instead, an operator will only need to pull a pin, spin a single sheave, and reinsert the pin in a different position in order to reorient the sheave to present a diameter for accommodating variable cable diameters. Thus, the presently disclosed multiple diameter sheave simplifies and speeds the procedure for transitioning from small to large cable diameters sheaves, and vice-versa.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1:
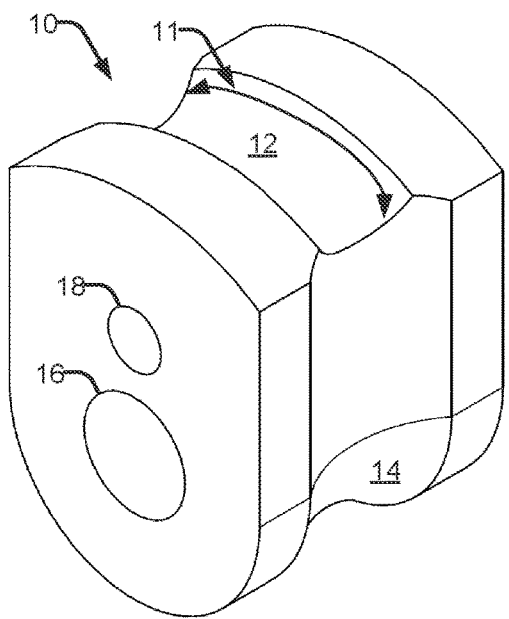
FIGS. 1-3 illustrate an example multi-diameter sheave, in accordance with aspects of this disclosure.

The present disclosure provides a sheave having multiple diameters. In particular, the sheave is configured for use in a tension measurement system to measure a tension force in cables of different diameters. For example, in order to mate a cable with a corresponding diameter of the sheave, the sheave is configured to rotate about an axis to orient one of a first diameter or a second diameter toward the cable during a measurement process. When the tension measuring system applies a contact force between the sheave and the cable (such as through manipulation of an adjustable support member or arm), a tension sensor measures a tension force in the cable.

The multiple diameters are arranged about the sheave such that a first arc length spans a first radial position (as measured from within the body of the sheave), and the second diameter is arranged at a second radial position spanning a second arc length. Thus, a central channel about the sheave may have multiple diameters, which can be adjusted and reoriented to accommodate testing of a cable with a particular diameter. Once properly oriented, the sheave can be fixed relative to the cable (e.g., via a fastener, pin, etc.) during a measurement process. The cable with therefore interface with the sheave, which bears the load during a measurement process, the tension on the cable being measured directly or indirectly as a result.

Further, the sheave is not limited to two diameters, and may have three or more diameters about the sheave.

The tension measurement system can include several components to facilitate the measurement process. For example, the adjustable support can be configured to rotate about a fulcrum located on a base to adjust the position of the sheave. Additionally, a plurality of tensioners configured to engage with the cable to provide the contact force between the sheave and the cable when the adjustable support positions the sheave adjacent to the cable.

Thus, as the sheave is arranged between two tensioners along a length of the cable, the contact force acting thereon is measured (e.g., via a sensor and determined by a measurement unit).

In order to fix the orientation, the sheave may include a first opening through which a fastener secures the sheave to the adjustable arm at the axis. A second opening that is offset from the first opening is designed to accept a removable pin, such that the second opening aligns with a first or second slot of the adjustable support to orient the first or second diameter toward the cable, respectively.

Tension measurement systems are widely used to measure tension in tower and stack guy wires, pretensioned cable barriers, bridges, elevators, winch rope, overhead electric transit wires, fall arrest systems, aircraft cables and utilities cable guardrails, to name but a few. The systems are designed to install on a cable, measure the tension, and be removed quickly. The use of sensitive measurement equipment, including digital loadcells, provide a highly accurate reading (e.g., within a 3 percent error threshold) without the need for reference to a lookup or correction table.

Tension measurement systems are conventionally able to measure tension capacities of about 2000 pounds/10 kN/1000 kg 10,000 pounds/45 kN/4500 kg, for example. This can be done on cables of varying diameters, such as 3/16 inch through over 1 inch (i.e. 4.75 mm through 25.4 mm) by employing a sheave configured to accommodate cables rated for a variety of sizes.

Despite the many uses of existing tension measuring devices, when converting the measurement system from a smaller diameter cable to a larger diameter cable, three of the smaller sheaves must be removed and replaced with three larger sheaves. Such a process is time-consuming and multiple sheaves are prone to misplacement, which may lead an operator to use a sheave that is not sized for the selected cable. The result can be incorrect or inaccurate readings, or damage to the measuring system and/or the cable.

By changing the groove diameter, as well as the effective sheave height (e.g. from a standard circular shape to an elongated form) there is no loss of performance during a measurement process. Moreover, although a vertical adjustment of the sheave would serve to change the height of the sheave relative to the tensioners, without the added accuracy associated with the change in diameter, errors may remain during measurement, especially with coarse cables.

Therefore, by employing a sheave in a tension measurement system as disclosed herein, a more robust, versatile, and sensitive system is provided. Advantageously, the sheave can be applied to various cable widths, with fewer manufactured parts, fewer and easier configuration changes, and more accurate measurements.

Figure 2:
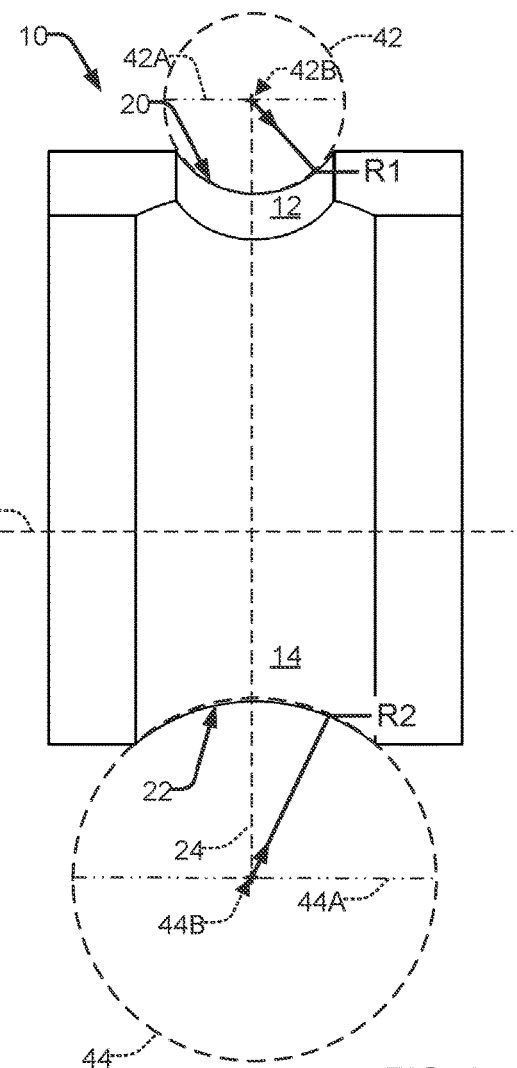
Figure 3:
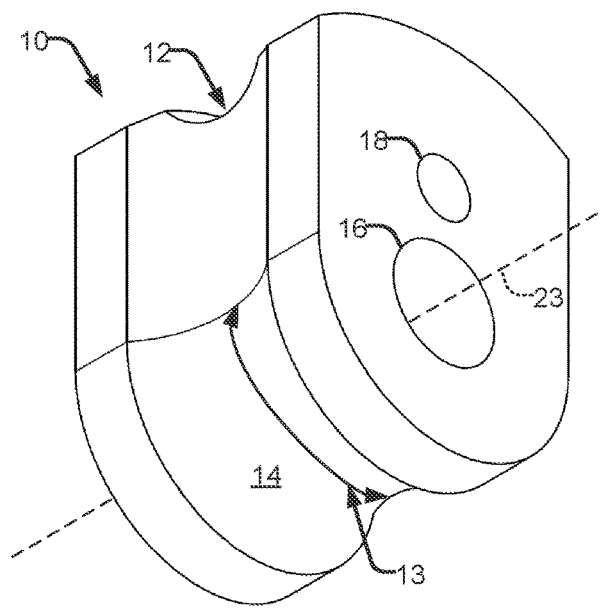

FIGS. 1-3 illustrate an example sheave 10 having a first diameter 12 and a second diameter 14. The sheave includes a first opening 16 about which the sheave is configured to rotate. A second opening 18 is configured to accept a pin or bolt, which can engage with an adjustable support (see, e.g., FIGS. 4-6). The pin can fix the position of the sheave 10 such that the first or second diameter is oriented toward the cable.

As shown in FIG. 2, the first diameter 12 is defined by a radius R1. For example, the radius R1 sweeps an arc 20 having a first arc length, as measured from a central plane 24 that is perpendicular to an axis of rotation 26 through the first opening 16. Similarly, the second diameter 14 sweeps an arc 22 having a second arc length, as measured from the central plane 24. For example, the first diameter 12 represents a diameter 42A of a first cable 42 configured for placement along the corresponding first portion 11 of an external surface of the sheave 10, whereas the second diameter 14 represents a diameter 44A of a second cable 44 configured for placement along a corresponding second portion 13 of the external surface of the sheave 10, such that the first and second portions 11 and 13 correspond to a portion of a channel that encircles the sheave along the central plane 24. Each of the diameter 42A and the radius R1 are measured from center point 42B, whereas each of the diameter 44A and the radius R2 are measured from center point 44B.

Thus the first and second diameters 12, 14 form a channel that circles the sheave 10 along the central plane 24, providing multiple arced grooves upon which a cable can be seated during testing.

Although illustrated as having a first diameter 12 and a second diameter 14, three or more diameters may be incorporated into a single sheave. Moreover, sheave 10 is illustrated as having a generally oblong shape with curved external sides. However, any shape and/or contours may be employed and capture the benefits of the disclosed sheave. For example, multiple diameters may be machined into a generally circular sheave; a generally triangular sheave may present three distinct diameters; a generally square sheave may have four diameters; or any geometry suitable to rotate about an axis and engage sufficiently with a cable during a measurement process.

The sheave 10 can be formed of any material of suitable strength for engagement with the cable. For example, metals, carbon compounds, polymers, or combinations thereof may be used to form the sheave 10. For measuring tension force in a cable that may be transmitting power, non-conductive materials may be used.

Although illustrated with the first opening 16 being larger than the second opening 18, the openings may be of equal size, or the relative sized reversed. Moreover, although illustrated as generally circular, the openings may have any suitable geometry that allows an operator to reorient the sheave to present a desired diameter to the cable. Furthermore, the second opening 18 is illustrated as extending through the sheave 10 to accommodate a removable pin. However, additional or alternative methods of fixing the orientation of the disclosed sheave are available, such as one or more grooves around an edge of the sheave, a slot within the groove through which a pin or other fastener can extend to fix the orientation, among other solutions.

In yet other examples, the adjustable support includes a frame at a distal end extending toward the cable and configured to accept the disclosed sheave in varying orientations. For example, a generally square sheave may fit into a generally square frame. Depending on which of the four sides is oriented toward the cable, four diameters of the sheave can be available for a measurement process.

Figure 4:
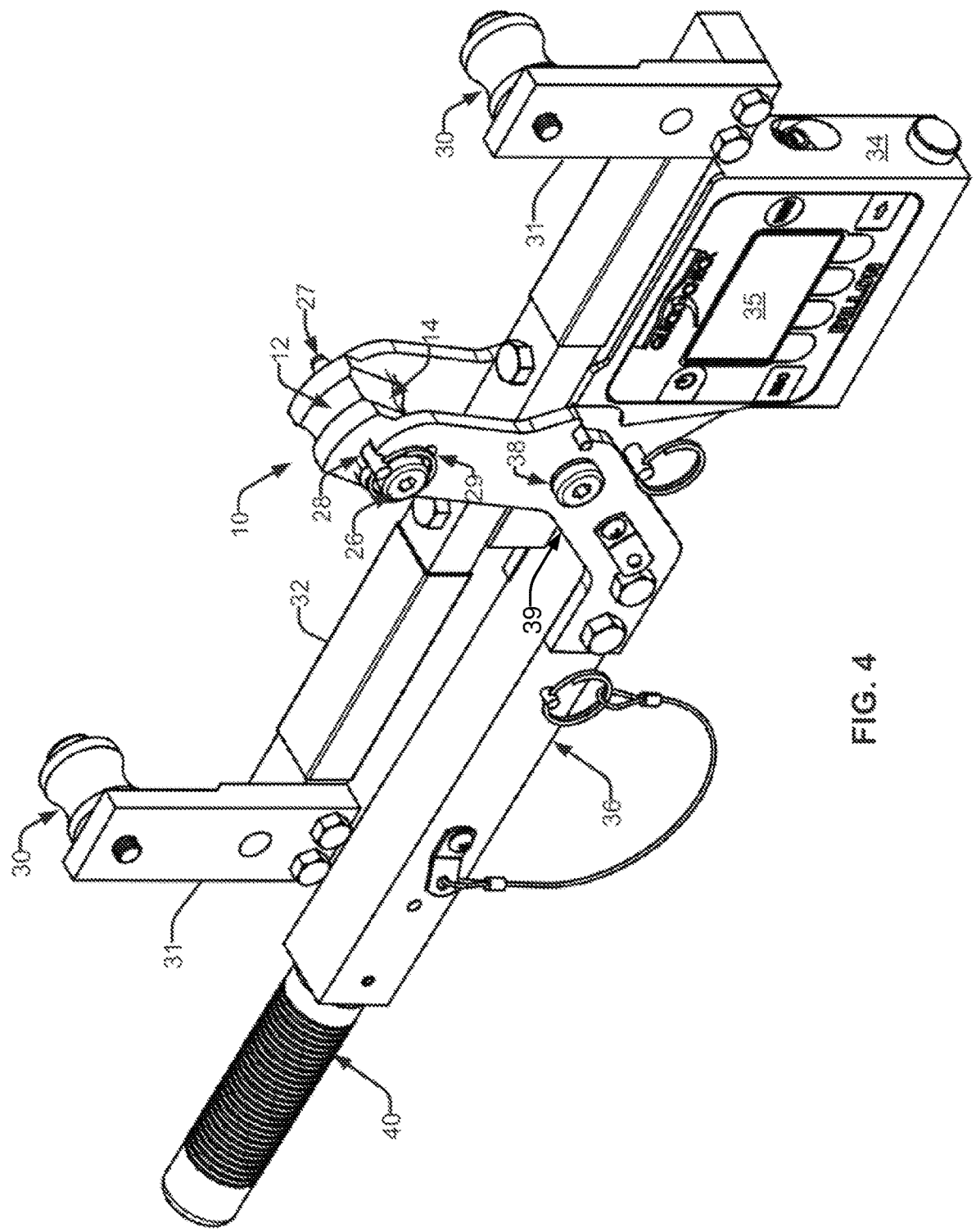
FIG. 4 illustrates a tension measurement system employing a multi-diameter sheave as shown in FIGS. 1-3, in accordance with aspects of this disclosure.

FIG. 4 illustrates an example tension measurement system to measure a tension force in a cable employing the sheave 10 of FIGS. 1-3. The system includes a base 32 upon which one or more tensioners 30 and/or an adjustable support or arm 36 are attached. The adjustable support 36 is configured to rotate about a fulcrum 38 and may include a handle 40 to provide leverage for an operator during deployment of the system. In some examples, the handle 40 includes a telescoping pole to improve leverage during a measurement process.

A measurement unit 34 is in communication with one or more sensors, and configured to generate a signal associated with a measured value (e.g., for display 35, to provide an audible alert, for transmission to a remote computing platform, etc.). The measurement unit 34 may include a processor configured to parse analog or digital signals from the one or more sensors in order to generate the signal.

The processor of the measurement unit will also be associated with a memory circuitry which may consist of one or more types of permanent and temporary data storage, such as for providing the analysis on sensor data and/or calibration. In some examples, a calibration process may be performed. For example, if two cables are to be measured, each with the same diameter, each cable may be calibrated independently if accuracy is critical.

The memory can be configured to store calibration parameters for a variety of unique cable sizes and/or types (e.g., cable material types, tension thresholds, storing measurements, error logs, etc.). The historical measurement data can correspond to, for example, operational parameters, sensor data, a user input, as well as data related to trend analysis, threshold tension values, profiles associated with a particular measurement process and/or cable type, etc., and can be stored in a comparison chart, list, library, etc., accessible to the processor. The output from the processor can be displayed graphically, such as the current tension measurement, a historical comparison, desired tension value, for instance.

As shown in FIG. 4, the sheave 10 is secured to the adjustable support 36 by a bolt 26 that extends through the first opening 16 as well as one or more corresponding slots of the adjustable support 36. The sheave 10 is configured to rotate about the bolt 26, such that a removable pin 27 can be inserted into a first slot(s) 28 or a second slot(s) 29 of the adjustable support 36. For example, when the removable pin 27 extends through the first slot 28 and the second opening 18, the first diameter 12 is oriented outwardly (i.e. toward the cable). Alternatively, when the removable pin 27 extends through the second slot 29 and the second opening 18, the second diameter 14 would be oriented toward the cable.

The tensioners 30 are mounted on risers or arms 31 and arranged relative to the base 32 such that, when the adjustable arm 36 is rotated about the fulcrum 38 during a measurement process, the cable engages with both the sheave 10 and the tensioners to result in a contact force. The contact force can be measured by a tension sensor 39 and, via the measurement unit 34, the tension force in the cable can be determined. The tensioners 30 can be pulleys that rotate freely during the measurement process to eliminate or reduce friction while facilitating engagement with the cable. In some examples, the tensioners 30 can be removable, such that a tensioner having a groove diameter that matches the selected diameter of the sheave 10 (e.g., the first or second diameter) is in contact with the cable.

Figure 5A:
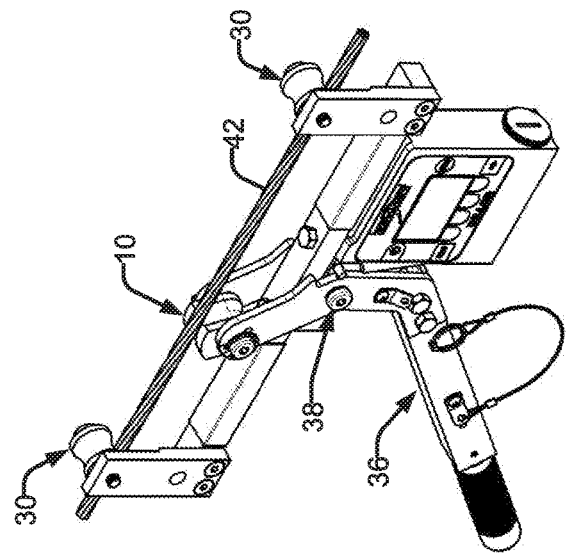
FIGS. 5A-5C illustrate example views of the tension measurement system of FIG. 4 being deployed, in accordance with aspects of this disclosure.
Figure 5B:
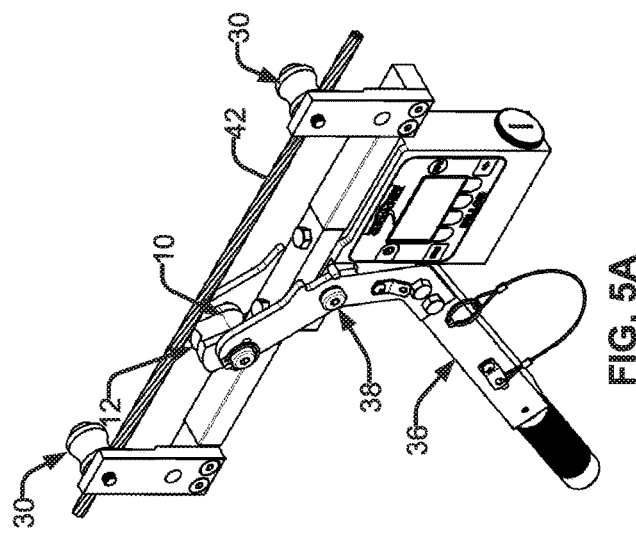
Figure 5C:
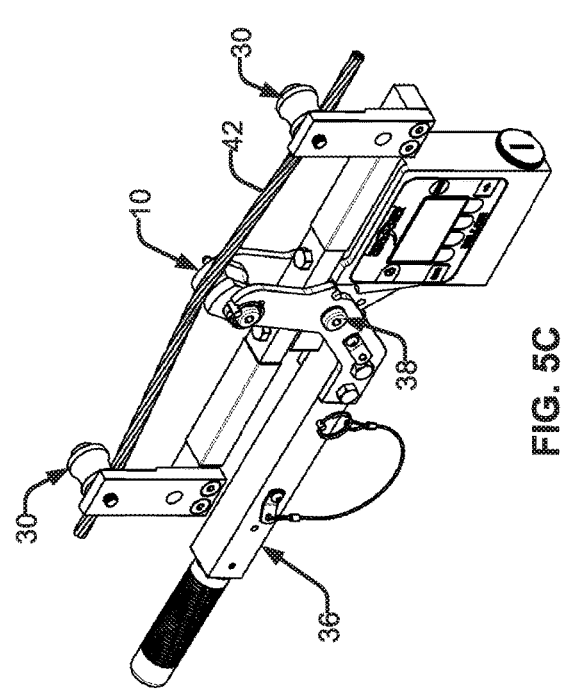

A measurement process is shown in three stages in FIGS. 5A-5C that illustrate the tension system engaging the sheave 10 with a cable 42. As shown in FIG. 5A, the adjustable arm 36 is open. This allows an operator to arrange the cable 42 between the tensioners 30 and the sheave 10. FIG. 5B shows a narrowing of the gap between the sheave 10 and the cable 42 as the two make contact. As the adjustable support 36 is rotated about the fulcrum 38, the sheave 10 slides into place against the cable 42, causing the contact force on the sheave 10 in a closed position, as shown in FIG. 5c.

Thus, as shown in FIG. 5C, the contact force caused by the sheave 10 forces the cable 42 away from the base 32, whereas the tensioners 30 force the cable 42 toward the base 32. This balance of forces is measurable by the one or more sensors (e.g., mechanical, torsional, optical, magnetic, etc.), and analyzed and computed by the measurement unit 34 for presentation to the operator.

Although illustrated as rotating about an axis to force contact between the sheave 10 and the wire 42, the adjustable support may be configured as a movable arm on a vertical guide. For example, the adjustable support may be fixed at the based in an adjustable position by a fastener (e.g., a screw, clip, tensioner, etc.). The fastener can be removed or loosened to allow for a change in position of the adjustable support and/or to reorient the sheave. Once in position to contact the cable 42, the fastener can be used to fix the position of the adjustable support during a measurement process.

Figure 6:
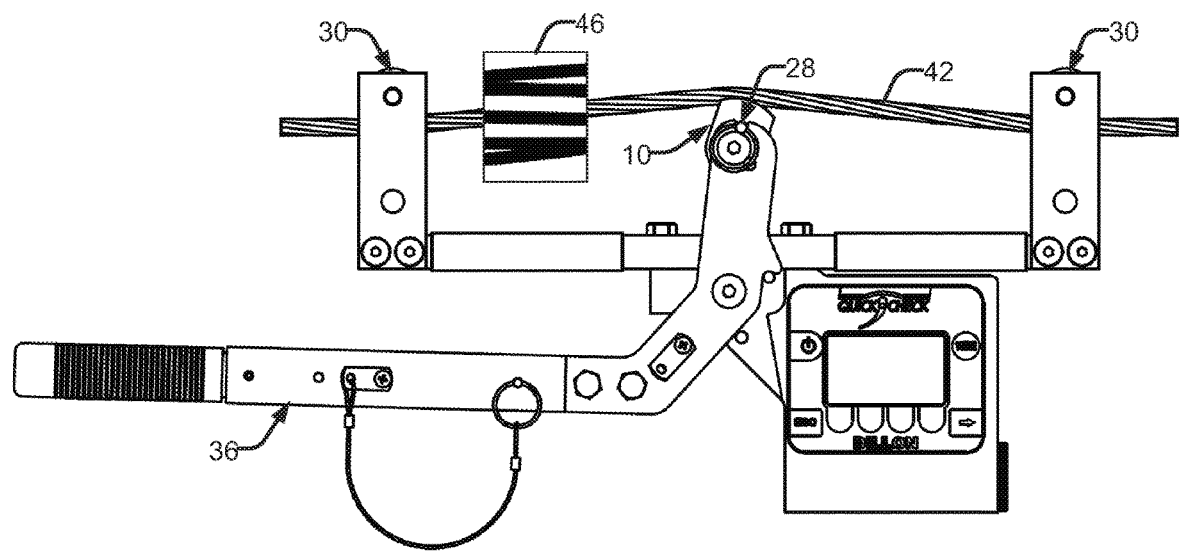
FIG. 6 illustrates an example tension measurement system engaging a cable with a first diameter of a sheave, in accordance with aspects of this disclosure.
Figure 7:
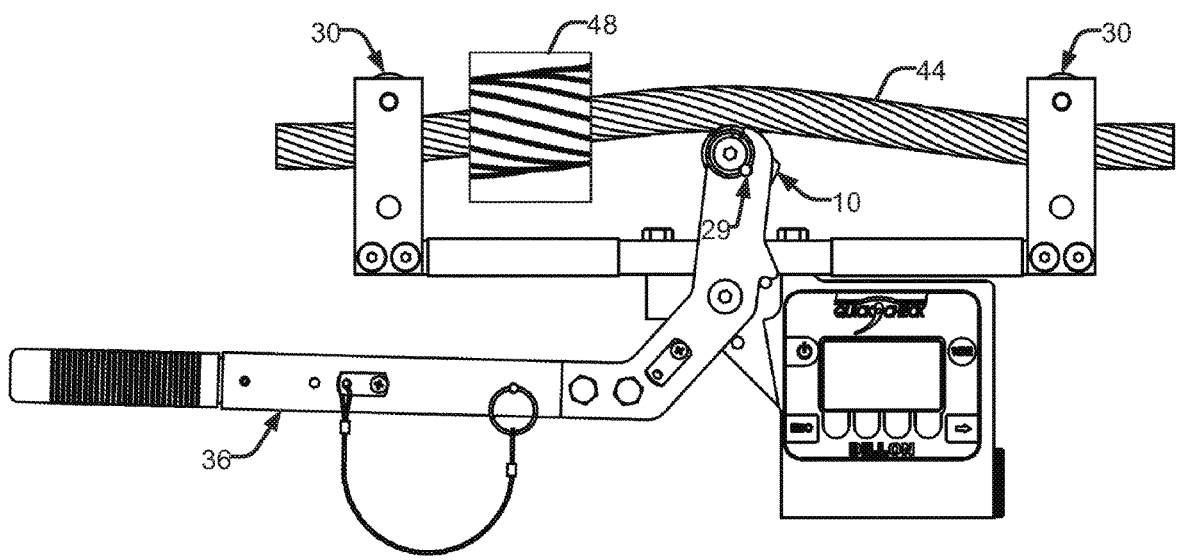
FIG. 7 illustrates an example tension measurement system engaging a cable with a second diameter of a sheave, in accordance with aspects of this disclosure.

FIG. 6 shows a tension measurement system where the first diameter 12 of the sheave 10 is engaged with the cable 42, as shown in FIG. 5C. For instance, the removable pin 27 is inserted into first slot 28, thereby orienting the first diameter 12 toward the cable 42. By contrast, the tension measurement system of FIG. 7 shows the removable pin 27 inserted into second slot 29, orienting the second diameter 14 toward cable 44. In this example, cable 44 has a diameter that is greater than cable 42. Accordingly, operating the tension measurement system with the second diameter 14 presented to the cable 44 provides for a more accurate cable tension measurement.

In some examples, a sheave can provide groove patterns on an arced surface (e.g., arc 20, 22). For instance, the arc may include striations that represent strands of a braided wire. In this example, the cable may more tightly fit within the diameter of the sheave, providing more accurate readings during a measurement process. In the magnified view 46, the cable 42 is made of fewer strands than cable 44. Thus, the contours of the strands of cable 42 will have a different character than that of cable 42, as shown in magnified view 48.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A sheave for use in a tension measurement system to measure a tension force in one or more cables, the sheave comprising:
   a first diameter; and
   a second diameter, wherein the first diameter and the second diameter form part of a channel that circles the sheave in a central plane perpendicular to an axis of rotation, the sheave configured to rotate about an axis to orient the first diameter or the second diameter toward the one or more cables, wherein a contact force between the sheave and the one or more cables is measured by a tension sensor to determine the tension force in the one or more cables,
   wherein the first diameter represents a diameter of a first cable of the one or more cables configured for placement along a first portion of the channel, and the second diameter represents a diameter of a second cable of the one or more cables configured for placement along a second portion of the channel.

2. The sheave of claim 1, wherein the first diameter is arranged at a first radial position spanning a first arc length along the channel, and the second diameter is arranged at a second radial position spanning a second arc length along the channel.

3. The sheave of claim 2, further comprising a third diameter arranged at a third radial position spanning a third arc length.

4. The sheave of claim 1, wherein the orientation of the sheave within the tension measurement system is fixed relative to the cable during a measurement process.

5. The sheave of claim 1, wherein an interior portion of one of the first diameter or the second diameter comprises a plurality of grooves to accommodate a plurality of strands associated with the cable.

6. A tension measurement system for measuring a tension force in a cable comprising:
   a sheave comprising a first diameter and a second diameter, wherein the first diameter and the second diameter form a channel that circles the sheave in a central plane perpendicular to an axis of rotation,
   wherein the first diameter is arranged at a first radial position spanning a first arc length along a first surface of the channel, the first diameter defined by a first radius R1 measured between a center point along the central plane external to the sheave and the first surface, and
   the second diameter is arranged at a second radial position spanning a second arc length along a second surface of the channel, the second diameter defined by a second radius R2 measured from a center point along the central plane external to the sheave toward the second surface, the sheave configured to rotate about an axis to orient the first diameter or the second diameter toward the cable;
   an adjustable support configured to adjust a position of the sheave relative to the cable; and
   a tension sensor to measure the tension force in the cable based on a contact force between the sheave and the cable.

7. The tension measurement system of claim 6, further comprising a base, wherein the adjustable support is configured to rotate about a fulcrum located on the base to adjust the position of the sheave.

8. The tension measurement system of claim 7, further comprising a plurality of tensioners configured to engage with the cable to provide the contact force between the sheave and the cable when the adjustable support positions the sheave adjacent to the cable.

9. The tension measurement system of claim 8, wherein the sheave is arranged between two tensioners of the plurality of tensioners along a length of the cable.

10. The tension measurement system of claim 9, wherein the sheave is arranged on a surface of the cable opposite the two tensioners.

11. The tension measurement system of claim 8, wherein a position of one or more of the plurality of tensioners are fixed relative to the base.

12. The tension measurement system of claim 6, wherein the sheave further comprises:
   a first opening through which a fastener secures the sheave to the adjustable arm at the axis; and
   a second opening that is offset from the first opening and configured to accept a removable pin, wherein the second opening is arranged to align with a first slot of the adjustable support to orient the first surface toward the cable, and a second slot of the adjustable support to orient the second surface toward the cable.

13. The tension measurement system of claim 6, wherein the sheave further comprises:
   a first opening through which a fastener secures the sheave to the adjustable arm at the axis; and
   a second opening that is offset from the first opening and configured to accept a removable pin.

14. The tension measurement system of claim 13, wherein the removable pin is configured to engage with a first slot or a second slot on the adjustable support to fix the orientation of the sheave relative to the cable.

15. The tension measurement system of claim 6, further comprising a processor configured to:
   receive a signal from the tension sensor associated with the measured tension force; and
   generate a tension force alert for presentation to a user.

16. A tension measurement system for measuring a tension force in a cable comprising:
   a sheave including a first surface configured to receive a first cable comprising a first diameter, and a second surface configured to receive a first cable a second diameter, wherein the first surface and the second surface form a portion of a channel that circles the sheave in a central plane perpendicular to an axis of rotation,
   the sheave configured to rotate about an axis to orient the first surface or the second surface toward the cable;
   an adjustable support comprising a first end to mount the sheave and a second end to control movement of the first end relative to the cable; and
   a plurality of tensioners configured to engage with the cable to provide a contact force between the sheave and the cable when the adjustable support positions the sheave adjacent to the cable, wherein a tension force results from the contact force, the tension force to be measured by a tension sensor, wherein the first diameter and the second diameter are different.

17. The tension measurement system of claim 16, wherein the adjustable support comprises a movable arm configured to move to adjust a position of the sheave relative to the cable, a base, or the plurality of tensioners.

18. The tension measurement system of claim 16, wherein the adjustable support comprises a telescoping pole to provide leverage for positioning the sheave relative to the cable.

19. The tension measurement system of claim 18, wherein the adjustable support further comprises a clamp configured to fix the position of the adjustable support in a desired position relative to the cable.

20. The tension measurement system of claim 16, wherein the sheave comprises a non-conductive material.

* * * * *